B. IRWIN.
FLUID METER.
APPLICATION FILED OCT. 17, 1916.
1,305,803.
Patented June 3, 1919.
2 SHEETS—SHEET 1.
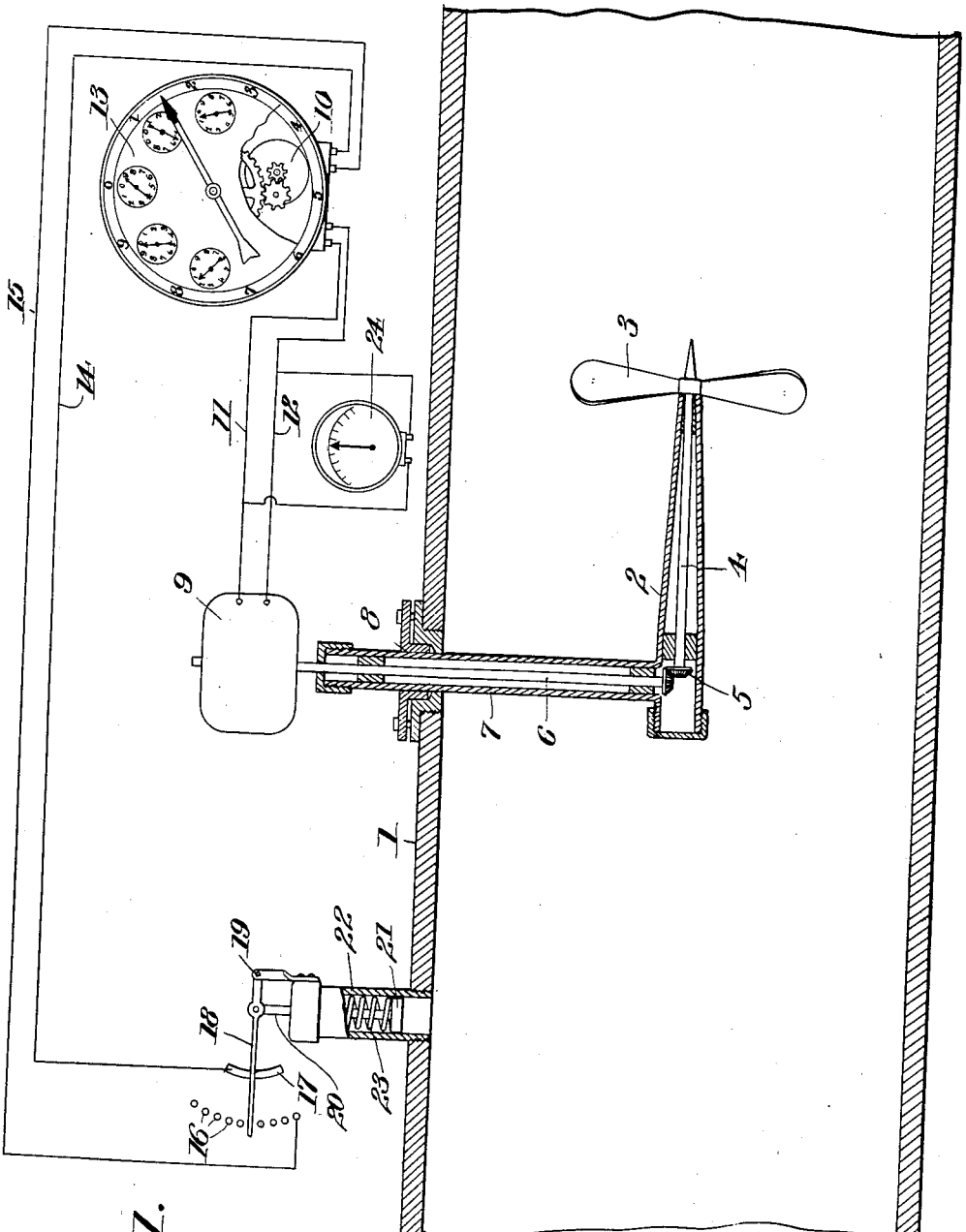
Inventor
Batte Irwin.
By G. Howlett Davis
Attorney

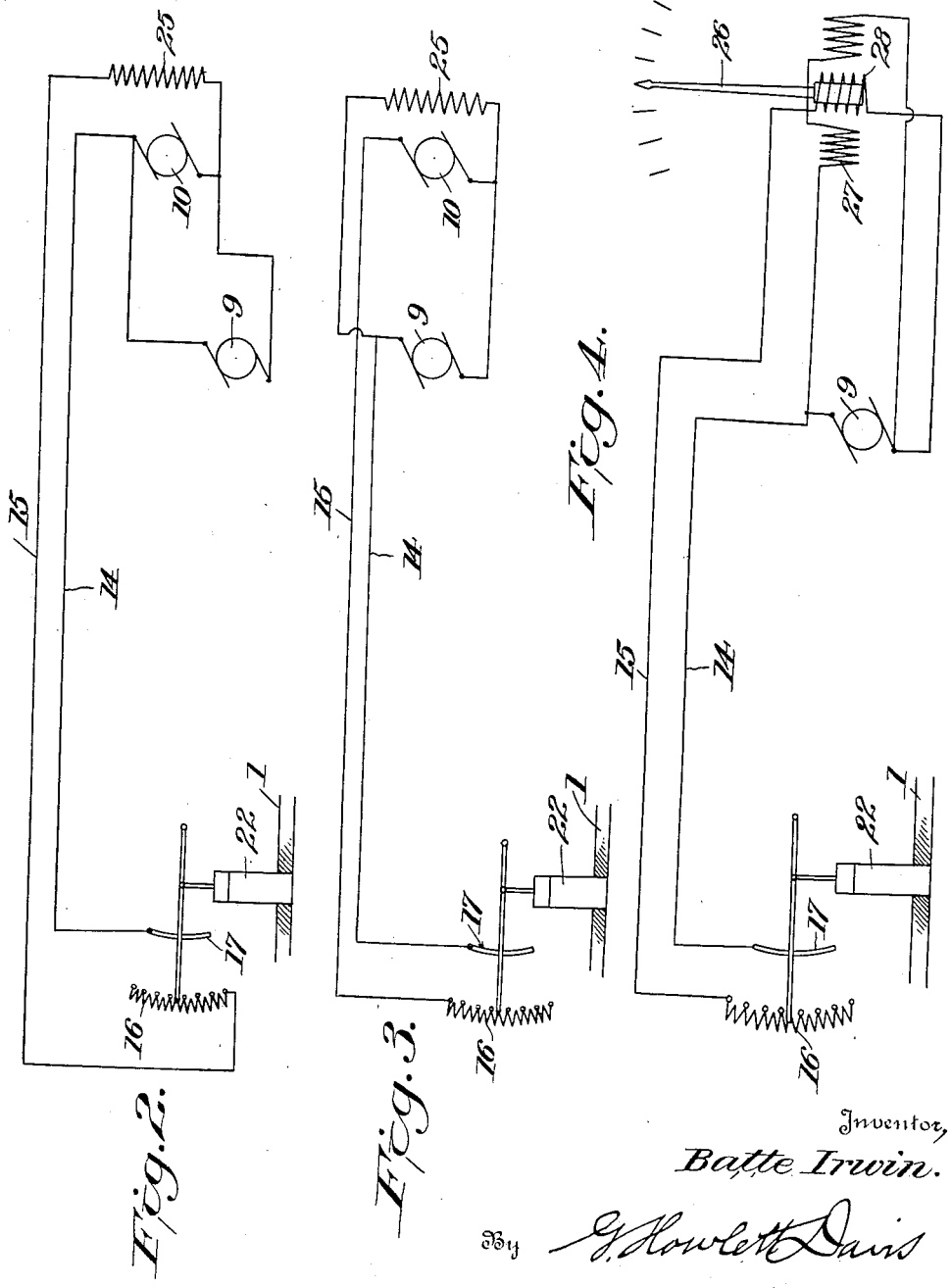

UNITED STATES PATENT OFFICE.

BATTE IRWIN, OF BROOKLYN, NEW YORK.

FLUID-METER.

1,305,803.　　　Specification of Letters Patent.　　Patented June 3, 1919.

Application filed October 17, 1916.　Serial No. 126,171.

*To all whom it may concern:*

Be it known that I, BATTE IRWIN, a citizen of the United States, residing at Brooklyn, in the county of Kings and State of New York, have invented certain new and useful Improvements in Fluid-Meters, of which the following is a specification.

This invention relates to meters, and more particularly to devices for measuring the flow of elastic fluids through pipes.

I propose to utilize the fluid stream for generating an electric current, which current is, in turn, utilized for operating electro-responsive devices arranged to actuate integrating or other recording or indicating meters.

In order that the invention may be readily understood, reference is had to the accompanying drawings, in which, Figure 1 is a sectional elevation of a conduit for carrying an elastic fluid, such as steam, and showing one of my improved metering devices connected therewith;

Figs. 2 and 3 are diagrams illustrating the circuit connections which may be employed when an integrating meter is used; and, Fig. 4 illustrates the circuits and apparatus utilized when an indicating meter is employed.

Referring to the drawings in detail, and more particularly to Fig. 1 thereof, a steam conduit is indicated at 1. In a suitable housing 2, extending longitudinally of the conduit 1 and preferably adjacent the center thereof, is rotatably mounted a shaft 4, to one end of which is secured a propeller wheel 3, disposed at right angles to the fluid flow. The other end of the shaft 4 carries a beveled gear 5, which meshes with a similar gear secured to the end of a shaft 6. This shaft 6 is suitably journaled in a casing 7, which extends through the wall of the conduit 1, a tight joint being secured by means of a stuffing box 8.

On the other end of the shaft 6 is mounted the armature of an electric generator 9. This generator may be either of the magneto or separately excited type, the essential requirement being that the field strength remains constant. The terminals of the generator 9 are connected by conductors 11 and 12 with a motor 10, preferably of the shunt wound type, and this motor has its armature operatively connected through suitable gearing with an integrating meter or register 13, of any suitable or desired type.

With the apparatus so far described, it is obvious that the speed of the generator 9, and hence its voltage, are proportional to the velocity of flow of the fluid through the conduit 1 past the propeller wheel 3. Since the speed of a shunt motor is proportional to the voltage impressed upon its terminals, within certain limits, it follows that the motor 10, and consequently the meter 13, will be driven at a speed proportional to the rate of flow of the fluid.

The total quantity of fluid measured in pounds per minute, for example, which flows past a given point in a given time, is dependent not only upon the velocity, in feet per minute, but also upon the density or pressure of the fluid. In order, therefore, to enable my improved meter to register the amount of fluid by weight which passes in a given time, I have provided means for increasing the speed of the motor 10 in proportion to the pressure or density of the fluid. This is accomplished by means of a rheostat 16, connected with the motor 10 by means of conductors 14 and 15. This rheostat may be placed either in the shunt field connection 25 of the motor 10, as shown in Fig. 2, or it may be placed in circuit with the armature of the motor, as illustrated in Fig. 3. In the former case, the conductor 15, leading from the field, is connected to the lower portion of the rheostat 16 so that upward movement of the regulating arm serves to increase the resistance, and this weakens the field, while in the second case, the conductor 15, leading from the armature of the motor, is connected to the upper side of the rheostat 16, so that upward movement of the regulating arm serves to decrease the resistance.

The regulating arm is indicated at 18, and is pivoted at 19 to a fixed support. It engages a contact segment 17, connected with the conductor 14. The arm 18 is pivoted to and actuated by a rod 20, secured to a piston 21, working in a cylinder 22, set into the wall of the conduit 1, and a coil spring 23 tends to move the piston 21 against the pressure of the fluid in the conduit. It will therefore be seen that the greater the pressure in the conduit, the higher the arm 18 will be moved, in one case cutting resistance into the field circuit of the motor, and in the other case cutting resistance out of the armature circuit of the motor, in either event, increasing the speed of the motor. The meter 13, therefore, is driven at a speed proportional at all times both to the velocity and pressure of the fluid in the conduit, and therefore where such fluid is in the nature of a saturated vapor, the dials can be calibrated to register the amount by weight of the fluid which passes.

If desired, an electro-responsive device, such as a volt meter, may be connected across the lines 11 and 12, as indicated at 24, and so calibrated as to indicate the velocity of flow of the fluid.

Where it is desired simply to indicate the amount of fluid instead of integrating the same, the arrangement shown in Fig. 4 may be adopted. In this case, an indicating device in the nature of a watt meter having a pointer 26 and the usual fixed and movable coils 27 and 28 respectively may be employed. One of these coils, such as 27, is connected across the generator 9, while the other, such as 28, is connected in circuit with such generator and the rheostat 16. It is obvious that the extent to which the needle 26 is moved is dependent upon the joint action of the two coils, which coils are respectively energized in proportion to the velocity and to the pressure of the fluid.

It will thus be seen that I have provided a complete electrical system for the measurement of fluid flow, and it will be understood that registering, or indicating devices of any desired character may be employed, in accordance with the results to be obtained.

What I claim is:

1. A fluid meter comprising a propeller, an electric generator mechanically driven thereby, a rheostat, an electro-responsive device electrically connected with said generator and rheostat, and means responsive to the pressure of the fluid being measured for governing said rheostat.

2. A fluid meter comprising a propeller, an electric generator mechanically driven thereby, an electro-responsive device electrically connected with said generator, a rheostat controlling said device, and means for automatically varying the effective resistance of said rheostat in accordance with the pressure of the fluid being measured.

3. A fluid meter comprising a propeller, an electric generator mechanically driven thereby, an electro-responsive device electrically connected with said generator, a rheostat controlling said device and having a movable element, and means for automatically shifting the position of such element in accordance with the pressure of the fluid being measured.

4. A fluid meter comprising a propeller, an electric generator mechanically driven thereby, an electro-responsive device electrically connected with said generator, a rheostat controlling said device and having a movable element, means actuated by the pressure of the fluid being measured for shifting said element in one direction to vary the resistance of said rheostat, and a spring acting against such pressure and tending to shift said element in the opposite direction.

In testimony whereof I have affixed my signature.

BATTE IRWIN.